Nov. 22, 1960          J. T. ROMINGER ET AL          2,960,923
            AIRCRAFT CABIN AIR PRESSURE EQUALIZATION SYSTEM
Filed April 24, 1958                                2 Sheets-Sheet 2

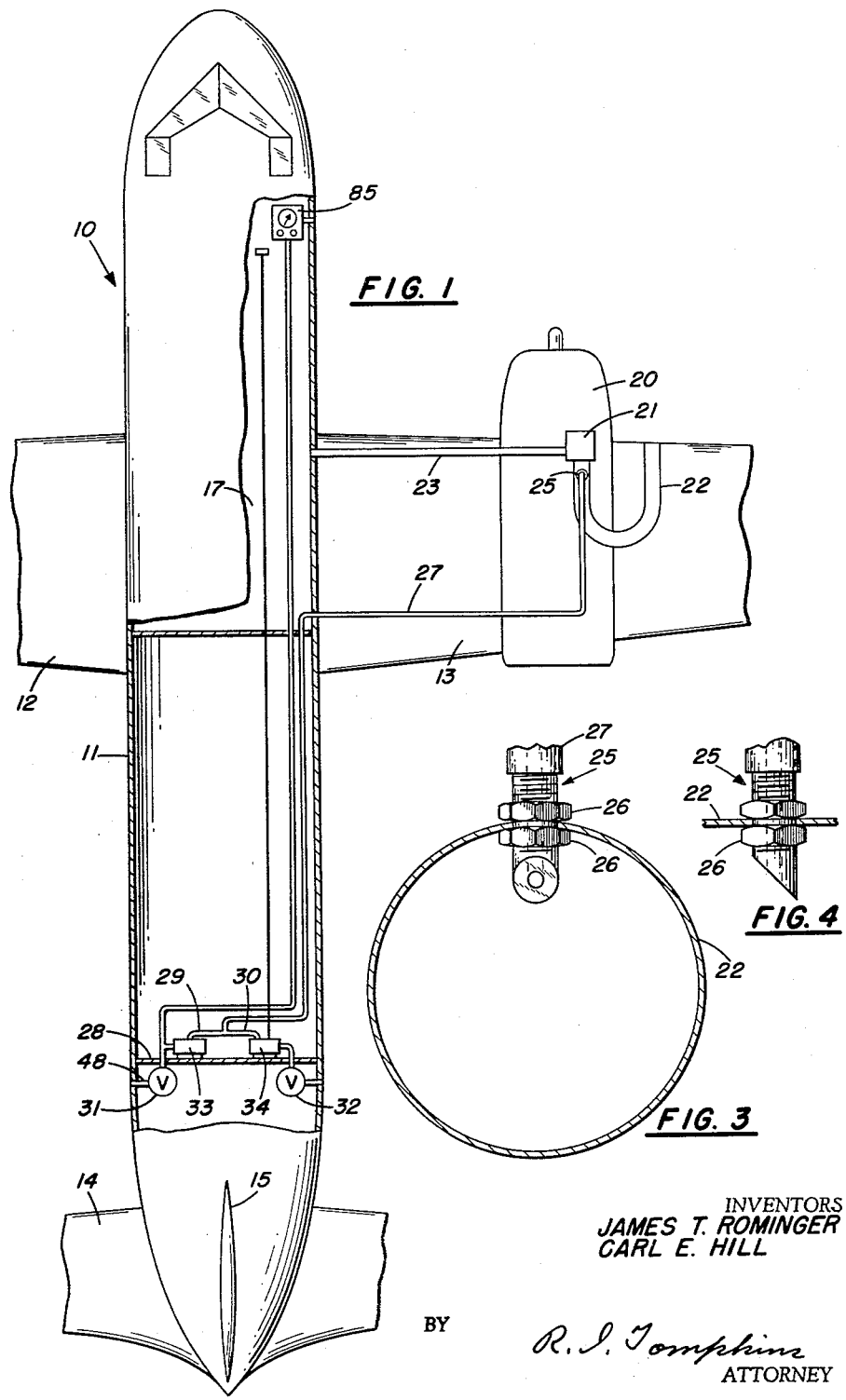

INVENTORS
JAMES T. ROMINGER
CARL E. HILL

BY
*R. J. Tompkins*
ATTORNEY

United States Patent Office 2,960,923
Patented Nov. 22, 1960

2,960,923

AIRCRAFT CABIN AIR PRESSURE EQUALIZATION SYSTEM

James T. Rominger, Pensacola, Fla., and Carl E. Hill, Dallas, Tex.; said Hill assignor to General Dynamics Corporation, San Diego, Calif., a corporation of Delaware Filed Apr. 24, 1958, Ser. No. 730,732

2 Claims. (Cl. 98—1.5)

(Granted under Title 35, U.S. Code (1952), sec. 266)

The invention described herein may be manufactured and used by or for the Government of the United States of America for governmental purposes without the payment of any royalties thereon or therefor.

This invention relates to air pressurized cabins for aircraft and other air pressurized compartments with special application to equalization of cabin pressures with atmospheric pressures on aircraft grounding and to maintain such pressure equalization while the aircraft is on the ground.

On grounding aircraft having pressurized cabins it is necessary to reduce cabin pressure to atmospheric levels and it is important that this be done without pressure surges which cause discomfort to crew and passengers of the craft. Heretofore, equalization was accomplished by controlled openings of the cockpit windows, but this requires the co-pilot's time during the busy landing period when he should be free for other tasks.

An important object of the invention is to provide means for cabin de-pressurization which is effected automatically on grounding of the aircraft. An object, also, is to provide means for cabin de-pressurization which can be accomplished readily and safely without pressure surging. An additional object is to provide depressurization means which utilizes, largely, existing apparatus in airplane structure. Another important feature of the invention is to prevent pressurization of the cabin while it is on the ground prior to take-off. Heretofore with the compressor running the last door or window to be closed prior to flight could not be closed in normal manner without a sudden surge of pressure which caused discomfort to crew and passengers. To prevent sudden pressure surges it was necessary for the co-pilot to close his cockpit window very slowly, a process which took approximately 20 to 30 seconds at a time when he should be free for other important tasks.

Other objects and many of the attendant advantages of this invention will be readily appreciated as the same becomes better understood by reference to the following detailed description when considered in connection with the accompanying drawings wherein:

Fig. 1 is a plan view with parts broken away of an airplane showing the cabin and pipeline system for pressure equalization;

Fig. 2 is a schematic view of the pressure system with enlarged sectional showings of the outlet and safety valves.

Fig. 3 is a section through the intake duct showing the pick-up nozzle; and

Fig. 4 is a detail side-view of the pick-up nozzle as mounted on the intake duct.

Referring to Fig. 1, an airplane 10 is indicated, including fuselage 11, wings 12, 13, elevator 14, rudder 15, nose 16 and cabin 17. Mounted on wings 12 and 13 are engine nacelles, nacelle 20 being indicated, and on nacelle 20 is placed the cabin compressor 21, connecting with the cabin compressor intake duct 22 and the airplane cabin through pipe 23. To the intake duct 22, which forms the low pressure side of the compressor 21, a pick-up nozzle 25 is applied. This nozzle is in the form of a short tube (Fig. 3) externally threaded for reception of attachment nuts 26 for holding the tube in an opening in the intake duct wall. The outer end of the tube is threaded for connection with pipe 27 and the inner end is within duct 22 inclined toward the intake end about 30 degrees and with the end surface inclined 45 degrees with the tube axis (Fig. 4). In placement, the nozzle is inserted in the intake duct wall with the angled end tip aft, meeting the air inflow, as indicated in Fig. 4, thus providing a venturi effect with reduced pressure.

Pipe 27 is led along the nacelle 20 and wing 13 to the fuselage 11, and within the fuselage aft to the transverse deck support 28, where it makes a T connection through juncture pipes 29 and 30 to the outflow and safety valves 31 and 32 respectively. Solenoid valves 33 and 34 are also included in the T connection, valve 33 in pipe 29 and valve 34 in pipe 30. Pipe 29, between solenoid valve 33 and outlet valve 31, has a permanently open connection at 84 to the cabin pressure regulator 85 through conduit 86. Regulator 85 is of conventional type and functions to maintain the cabin pressure at a predetermined set value, through outlet valve 31.

The outflow and safety valves 31 and 32 are mounted on the deck support 28 and each has an outlet to the atmosphere. As shown in Fig. 2, the outflow valve 31 includes a generally tubular shell 35 having a radial base flange 36 for attachment to the deck support and an inlet opening 9, a cap 37, a dividing rigid plate 38 having a central annular depresison 39, a coil spring 40 having one end seated in the depression 39 and other end contacting the casing cap 37, and a flexible annular connection 41 between the outer edge of plate 38 and the ringed junction between the top of shell 35 and the cap 37. This flexible connection 41 is of air tight material, such as leather, and the edges are securely clamped at the junction rings so as to resist air leakage.

Beneath plate 38 is placed a second plate 42 having a central hollow vertical core piece 43 to which is secured a flared curved peripheral section. From the outer edge of this flared section depends an annular rigid ring 44 having a series of holes 45 therein. The lower edge of the ring has a leakproof connection to the base ring 46, the lower edge of this ring forming an air tight junction with the shell 35. The edge of plate 38 is turned downwardly to rest over and close the holes 45 in ring 44, when the plate 38 is in its down position; and to free these holes for air passage when plate 38 is in its up position. Outlet pipe 48 connects to a point outside the fuselage, as is indicated in Fig. 1.

To insure maintenance of axial reciprocation within shell 35, plate 38, at its center, is provided with a depending pin 49 which moves in the hollow of core piece 43.

In operation, when the pressure in the upper chamber 8 of valve 31 is reduced below cabin pressure, plate 38 rises uncovering outlet openings 45 in fixed ring 44, and permitting air flow through outlet tube 48. After pressure reduction to a value where the pressure of spring 40 exceeds the pressure differential between the cabin and chamber 8, the valve closes.

Valve 32, while otherwise substantially identical to valve 31, is provided additionally with self sealing manual and automatic dump valves 50 and 51. Manual dump valve 50 includes a valve tube 52 having a base end valve aperture 53 over which, inside the tube, is a valve plate closure integral with an elongated tube 54 which connects to rod 55 and handle 56. A spring inside valve tube 52 and surrounding elongated tube 54 normally holds this valve closed. The base of valve 32 supports the guide rod 58, movable in core piece 60, by means of connector 61. In use, upward movement of handle 56 lifts valve plate 38 to permit air flow through inlet 41, valve openings 45 and through outlet 48.

The automatic valve 51 includes a port 65 in the cap top and a valve 66 normally holding said port closed through action of spring 67 which surrounds the valve stem 68 and presses between the cap and the valve top surfaces. Inside the cap space and below the valve, connection to the cabin space is made through the tube 70. Above the valve connection to atmosphere is made through the tube 71. In operation, when the cabin pressure exceeds a predetermined point, as determined by the setting of nut 72 on the valve stem 68, valve 66 opens and the cabin pressure is reduced to a point where the spring 67 again functions to close the valve.

Normally the safety valve 32 is closed and inoperative as long as the solenoid valve 34 is closed. However, the outlet valve 31 is normally modulating under the control of the cabin pressure regulator 85 when solenoid valve 33 is closed. To open the solenoid valves an electrical circuit is provided which includes in series the main landing gear scissors switch 80 of the airplane, so that only on landing are the valves 33 and 34 opened to make suction effective in outlet and safety valves 31 and 32, respectively, and thus de-pressurize the cabin to atmospheric values. It follows, also, that during the flight the valves 33 and 34 are closed.

Obviously many modifications and variations of the present invention are possible in the light of the above teachings. It is therefore to be understood that within the scope of the appended claims the invention may be practiced otherwise than as specifically described.

What is claimed is:

1. An air de-pressurization system for pressurized compartments in aircraft comprising an air compressor having an air inlet duct, a conduit for supplying compressed air to an aircraft compartment, an outlet conduit for discharge of compressed air from said compartment, an outlet valve in said outlet conduit, said outlet valve modulating under the control of a regulator to maintain desired cabin pressure in aircraft flight, said outlet valve comprising a casing, a diaphragm dividing said casing into two chambers, and outlet port closure means actuated by movement of said diaphragm, and means for fully opening said valve without surge effects in said compartment on contact of said aircraft with ground, said outlet valve opening means comprising a source of reduced air pressure below atmospheric pressure, a control valve, a conduit between said source of reduced air pressure and control valve and between said control valve and one of said outlet valve chambers, a ground contact switch member normally open but closed on ground contact, and connections between said ground contact member and control valve to open said valve on ground contact of said ground contact member, said source of reduced air pressure having nozzle means operatively connected at one end to said conduit between said reduced pressure source and said control valve, and the other end of said nozzle means extending into said air inlet duct whereby said source of reduced air pressure is communicated to said outlet valve when said control valve is open.

2. An air de-pressurization system for pressurized compartments in aircraft, comprising an air compressor having an air inlet duct, a conduit for supplying compressed air to an aircraft compartment, an outlet conduit for discharge of compressed air from said compartment, an outlet valve in said outlet conduit, said outlet valve modulating under the control of a regulator to maintain desired cabin pressure in aircraft flight, said outlet valve comprising a casing, a diaphragm dividing said casing into two chambers, and outlet port closure means actuated by movement of said diaphragm, and means for fully opening said valve without surge effects in said compartment on contact of said aircraft with ground, and said outlet valve opening means comprising a source of reduced air pressure, a control valve, a conduit between said source of reduced air pressure and control valve and between said control valve and one of said outlet valve chambers, a ground contact switch member normally open but closed on ground contact, and connections between said ground contact member and control valve to open said valve on ground contact of said ground contact member, said source of reduced pressure including an elongated nozzle tube connected to the end of said conduit between said reduced pressure source and control valve and extending within and attached to the air inlet duct of said air compressor, said nozzle having its end within the inlet duct cut at an angle with the nozzle axis and positioned within the inlet duct with the long edge forward toward the open end of the inlet duct.

References Cited in the file of this patent

UNITED STATES PATENTS

| | | |
|---|---|---|
| 2,342,220 | Price | Feb. 22, 1944 |
| 2,391,197 | Schwien | Dec. 18, 1945 |
| 2,549,673 | Del Mar | Apr. 17, 1951 |
| 2,672,086 | Jensen | Mar. 16, 1954 |
| 2,773,440 | Arthur | Dec. 11, 1956 |